(12) United States Patent
Waye et al.

(10) Patent No.: US 10,190,594 B2
(45) Date of Patent: Jan. 29, 2019

(54) VACUUM PUMP

(71) Applicant: Edwards Limited, West Sussex (GB)

(72) Inventors: Andrew Waye, Forest Row (GB);
Emiliano Lucchetta, Worthing (GB)

(73) Assignee: Edwards Limited, Burgess Hill, West Sussex (GB)

( * ) Notice: Subject to any disclaimer, the term of this patent is extended or adjusted under 35 U.S.C. 154(b) by 481 days.

(21) Appl. No.: 14/786,075

(22) PCT Filed: Apr. 22, 2014

(86) PCT No.: PCT/GB2014/051245
§ 371 (c)(1),
(2) Date: Oct. 21, 2015

(87) PCT Pub. No.: WO2014/174273
PCT Pub. Date: Oct. 30, 2014

(65) Prior Publication Data
US 2016/0097398 A1    Apr. 7, 2016

(30) Foreign Application Priority Data

Apr. 22, 2013 (GB) .................................. 1307196.4

(51) Int. Cl.
*F04D 29/063* (2006.01)
*F04D 19/04* (2006.01)
(Continued)

(52) U.S. Cl.
CPC ......... *F04D 29/063* (2013.01); *F04D 19/042* (2013.01); *F04D 29/058* (2013.01);
(Continued)

(58) Field of Classification Search
None
See application file for complete search history.

(56) References Cited

U.S. PATENT DOCUMENTS

| 4,286,829 A | 9/1981 | Heemskerk |
| 2008/0112660 A1 | 5/2008 | Koch et al. |
| 2010/0296917 A1 | 11/2010 | Waye et al. |

FOREIGN PATENT DOCUMENTS

| CN | 1157027 A | 8/1997 |
| DE | 2119857 A | 11/1972 |

(Continued)

OTHER PUBLICATIONS

First Office Action, and translation thereof, from counterpart Chinese Patent Application No. 201480022752.6, dated Aug. 3, 2016, 12 pp.

(Continued)

*Primary Examiner* — Kayla McCaffrey
(74) *Attorney, Agent, or Firm* — Westman, Champlin & Koehler, P.A.; Theodore M. Magee

(57) ABSTRACT

The present disclosure relates to a vacuum pump including a bearing and a lubricant supply system for lubricating the bearing. The lubricant supply system includes: a lubricant reservoir comprising a reservoir matrix for receiving a lubricant; a lubricant transfer arrangement in contact with the reservoir matrix for transferring lubricant from the reservoir matrix to the bearing, the lubricant reservoir including a reservoir enclosure for locating the reservoir matrix in position relative to the lubricant transfer arrangement; wherein the lubricant reservoir includes a plurality of contact regions at which the reservoir matrix is in contact with the reservoir enclosure for locating the reservoir matrix in position relative to the lubricant transfer arrangement and a plurality of spacing regions between respective contact regions at which the reservoir matrix is spaced apart from the reservoir enclosure for receiving gas and lubricant foam caused by outgassing in the lubricant in the reservoir matrix.

19 Claims, 7 Drawing Sheets

(51) Int. Cl.
    *F04D 29/059*     (2006.01)
    *F04D 29/058*     (2006.01)
    *F16C 33/66*     (2006.01)
    *F16C 19/06*     (2006.01)

(52) U.S. Cl.
    CPC ........ *F04D 29/059* (2013.01); *F16C 33/6648* (2013.01); *F16C 19/06* (2013.01); *F16C 2360/45* (2013.01)

(56) References Cited

FOREIGN PATENT DOCUMENTS

| | | |
|---|---|---|
| DE | 102010021945 A1 | 12/2011 |
| EP | 2171280 B1 | 9/2012 |
| EP | 2557315 A2 | 2/2013 |
| JP | 2006250193 A | 9/2006 |
| WO | 2009004378 A2 | 1/2009 |

OTHER PUBLICATIONS

Search Report under Section 17 dated Oct. 28, 2013 in counterpart GB Application No. GB1307196.4, 4 pgs.
International Search Report and Written Opinion dated Jul. 30, 2014 in counterpart International Application No. PCT/GB2014/051245, 12 pgs.
Japanese Office Action dated Jan. 22, 2018 for corresponding Japanese Application No. 2016-509544.

VACUUM PUMP

This application is a national stage entry under 35 U.S.C. § 371 of International Application No. PCT/GB2014/051245, filed Apr. 22, 2014, which claims the benefit of G.B. Application 1307196.4, filed Apr. 22, 2013. The entire contents of International Application No. PCT/GB2014/051245 and G.B. Application 1307196.4 are incorporated herein by reference.

TECHNICAL FIELD

This invention relates to a vacuum pump, and in particular to the lubrication of rolling bearings used to support the impeller of a vacuum pump.

BACKGROUND

Vacuum pumps typically comprise an impeller in the form of a rotor mounted on a shaft for rotation relative to a surrounding stator. The shaft is supported by a bearing arrangement comprising two bearings located at or intermediate respective ends of the shaft. One or both of these bearings may be in the form of rolling bearings. Usually, the upper bearing is in the form of a magnetic bearing, and the lower bearing is in the form of a rolling bearing.

A typical rolling bearing comprises an inner race fixed relative to the shaft, an outer race, and, located between the races, a plurality of rolling elements for allowing relative rotation of the inner race and the outer race. To prevent mutual contacts between the rolling elements, they are often guided and evenly spaced by a cage. Adequate lubrication is essential to ensure accurate and reliable operations of rolling bearings. The main purpose of the lubricant is to establish a load-carrying film separating the bearing components in rolling and sliding contact in order to minimise friction and wear. Other purposes include the prevention of oxidation or corrosion of the bearing components, the formation of a barrier to contaminants, and the transfer of heat away from the bearing components. The lubricant is generally in the form of either oil or grease (a mixture of oil and a thickening agent).

Vacuum pumps using oil-lubricated bearings require an oil feeding system for feeding oil between the contact areas of the bearing, which enables the oil to perform cooling as well as lubrication and thereby permit the bearings to run at a faster speed. Turbo-molecular pumps have traditionally used a wicking system for supplying oil to a rolling bearing. In such a system, a felt wick partially submerged in an oil reservoir feeds oil to a conical "oil feed" nut mounted on the shaft. With rotation of the pump, oil travels along the conical surface of the nut to the bearing. The oil passes through the bearing and is returned to the reservoir.

In such oil feeding systems, a pressure differential may be generated across the oil reservoir which causes outgassing in the reservoir. In static conditions when the pump is not operating but is being initially evacuated by a primary pump outgassing can cause oil to escape from the bearing cavity and contaminate the pump. Vibrational excitation during use of the pump may additionally promote the nucleation of bubbles contributing to oil loss. Over and above contamination and loss of oil, outgassing may cause an excess of oil to be transferred to the oil feed nut which may stress the bearing.

SUMMARY

The present invention seeks to reduce the effect of outgassing in vacuum pumps.

The present invention provides vacuum pump comprising a bearing and a lubricant supply system for lubricating the bearing; the lubricant supply system comprising: a lubricant reservoir comprising a reservoir matrix for receiving a lubricant; a lubricant transfer arrangement in contact with the reservoir matrix for transferring lubricant from the reservoir matrix to the bearing, the reservoir comprising a reservoir enclosure for locating the reservoir matrix in position relative to the lubricant transfer arrangement; wherein the reservoir comprises a plurality of contact regions at which the reservoir matrix is in contact with the reservoir enclosure for locating the reservoir matrix in position relative to the lubricant transfer arrangement and a plurality of spacing regions between respective contact regions at which the reservoir matrix is spaced apart from the reservoir enclosure for receiving gas and lubricant foam caused by outgassing in the lubricant in the reservoir matrix.

Other preferred and/or optional aspects of the inventions are defined in the accompanying claims.

BRIEF DESCRIPTION OF DRAWINGS

In order that the invention may be well understood, an embodiment thereof, which is given by way of example only, will now be described with reference to the accompanying drawings.

DETAILED DESCRIPTION

Figure 1:
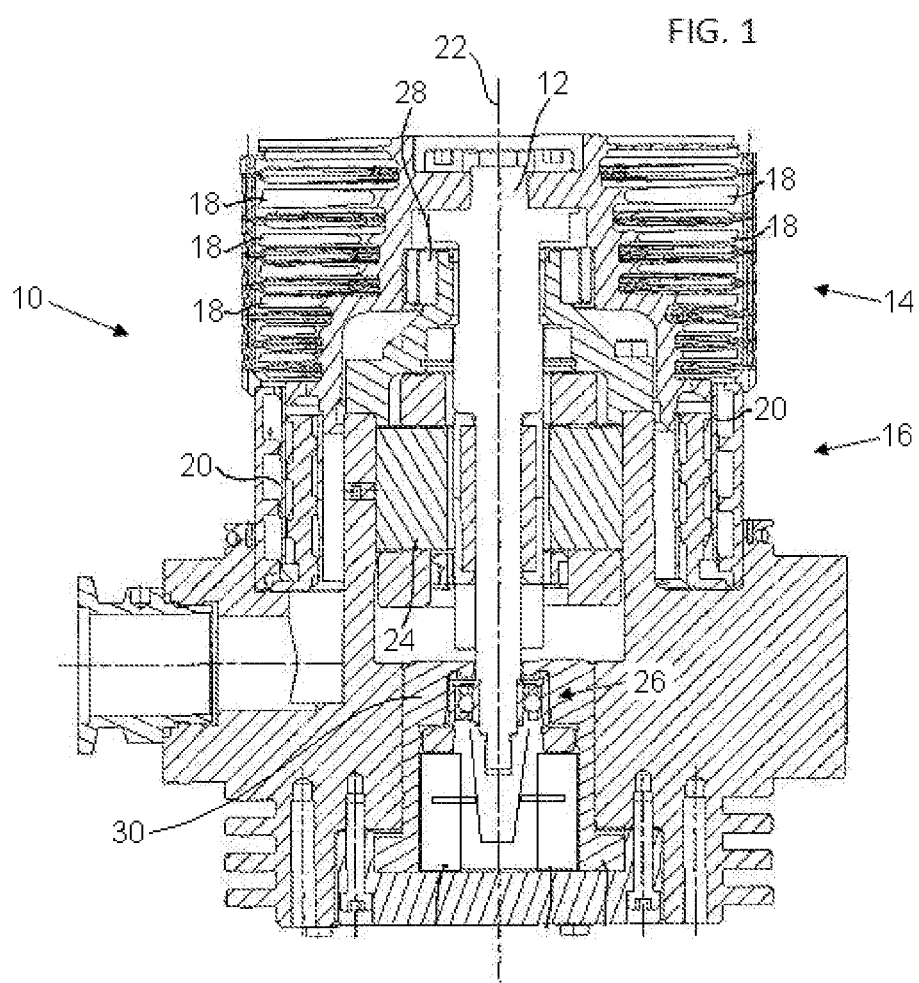
FIG. 1 shows a section of a vacuum pump.

Referring to FIG. 1, a cross-section of a vacuum pump 10 is shown comprising a pumping arrangement driven by a shaft 12. The illustrated vacuum pump is a turbomolecular vacuum pump comprising a turbomolecular pumping mechanism 14 and a molecular drag pumping mechanism 16. The turbomolecular pumping mechanism comprises a plurality of rotor blades 18 mounted on, or integral with, the shaft 12. The molecular drag pumping mechanism 16 is in the form of a Holweck pumping mechanism, and comprises one or more cylinders 20 mounted on the shaft 12. The molecular drag pumping mechanism may alternatively comprise a Siegbahn mechanism comprising rotating discs. There may be additional or alternative mechanisms such as an aerodynamic pumping mechanism downstream of the molecular drag pumping section, comprising a regenerative mechanism.

The shaft is rotated about longitudinal axis 22 by a motor 24 to drive the pumping arrangement. The shaft 12 is supported by a bearing arrangement comprising two bearings which may be positioned either at respective ends of the shaft as shown or alternatively intermediate the ends. In FIG. 1, a rolling bearing 26 supports a first portion of the shaft 12 and a magnetic bearing 28 supports a second portion of the shaft 12. A second rolling bearing may be used as an alternative to the magnetic bearing 28. When a magnetic bearing is used, it may also be desirable to incorporate a back-up bearing.

Figure 2:
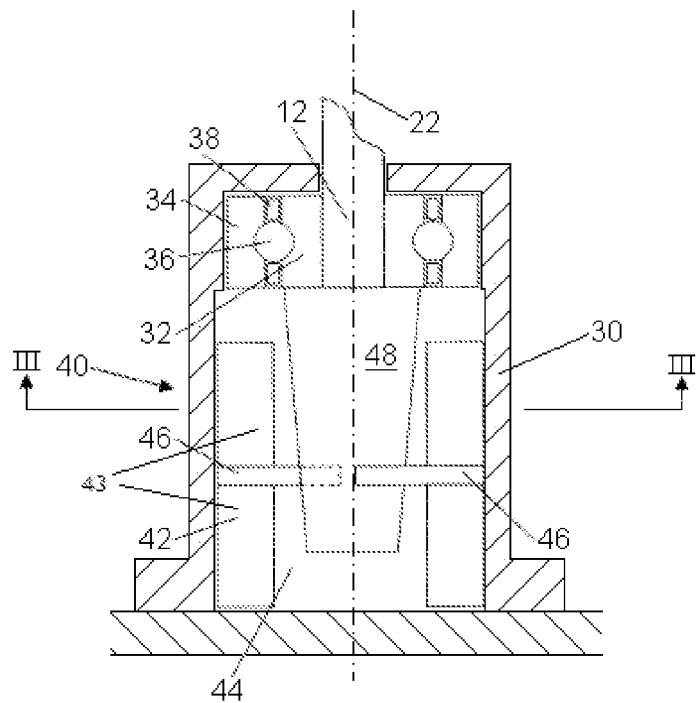
FIG. 2 shows a section of a lubricant supply system of the vacuum pump shown in FIG. 1.

The rolling bearing 26 is provided between the second end portion of the shaft 12 and a housing portion 30 of the pump 10. With reference also to FIG. 2, the rolling bearing 26 comprises an inner race 32 fixed relative to the shaft 12, an outer race 34, and a plurality of rolling elements 36, supported by a cage 38, for allowing relative rotation of the inner race 32 and the outer race 34.

The rolling bearing 26 is lubricated by a lubricant supply system 40 to establish a load-carrying film separating the bearing components in rolling and sliding contact in order to minimise friction and wear. The lubricant supply system 40 comprises a liquid lubricant reservoir 42, which surrounds an axis of rotation 12 of the shaft 12. The reservoir 42 comprises a reservoir matrix formed in this example by a stable fibrous annular substrate surrounding a central bore 44 of the reservoir 42, and having voids within which oil, or other liquid lubricant, is stored. The reservoir 42 comprises at least one and preferably a multiplicity of projections 46 which project into the bore 44. The projections may be made from a similar fibrous material, such as felt, or by filaments forming brushes.

The projections are held by the reservoir 42 so that they are in contact with a tapered feed nut 48 mounted on the shaft 12 and located within the bore 44 of the reservoir. The end of the tapered nut located adjacent the bearing 26 has an external diameter which is approximately equal to the internal diameter of the cage 38 of the bearing. In this embodiment, the projections are located approximately mid way along the axial length of the reservoir 42. However, this location is arbitrary and the axial location of the projections may vary from one vacuum pump to another. In another example, the projections or fingers may be omitted and in this case, the annular body of the reservoir matrix may be located in contact with the lubricant transfer arrangement, so that an interior surface contacts the oil feed nut 48 over at least a portion of the axial extent of the matrix. Lubricant can therefore be transferred from the interior surface of the matrix directly to the lubricant transfer arrangement. In a modification of this latter example, the reservoir matrix may extend radially inwardly to a greater extent at one axial portion, for example a middle portion, to contact the oil feed nut. The matrix may be formed by more than one component stacked one on another in layers and one of the layers may project further inwards than the layers adjacent to it in order to contact the oil feed nut.

In use of the illustrated example, the lubricant is drawn along the projections 46 and is deposited onto the feed nut 48 as it rotates. This lubricant is transferred axially along the feed nut to the cage 38 of the bearing 26 by virtue of the taper on the nut and the rotation of the nut.

Figure 3:
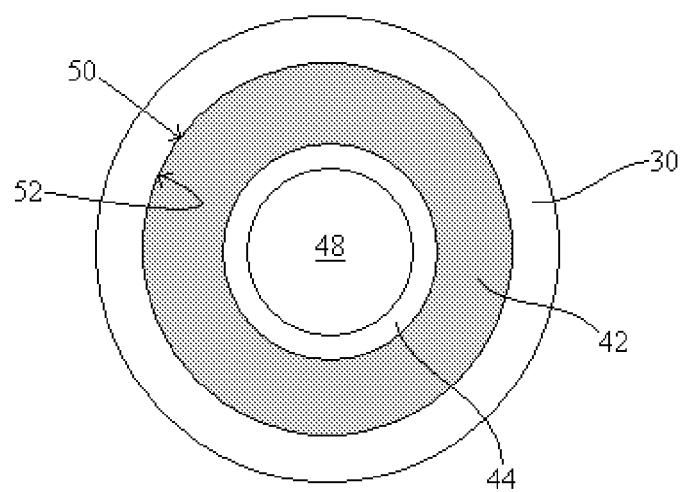
FIG. 3 shows a cross-section a known lubricant supply system.

FIG. 3 is a cross-section taken along line III-III in FIG. 2 looking towards the bearing 26 and shows a prior art lubricant supply system. In this system, the external surface 50 of the reservoir matrix 42 is in contact with the internal surface 52 of the housing portion 30 throughout the circumference of the surfaces. The reservoir material is to some extent resilient and its shape is at least partially formed by its location within the housing portion, which acts as a reservoir enclosure containing the matrix. In this example, the internal surface of the housing portion 30 has a circular cross-section which is uniform in the axial dimension forming a cylindrical surface. The external surface similarly has a circular cross-section of the same radius, or marginally larger, than the radius of the internal surface. The external surface is also uniform in the axial dimension forming a cylinder.

Figure 4:
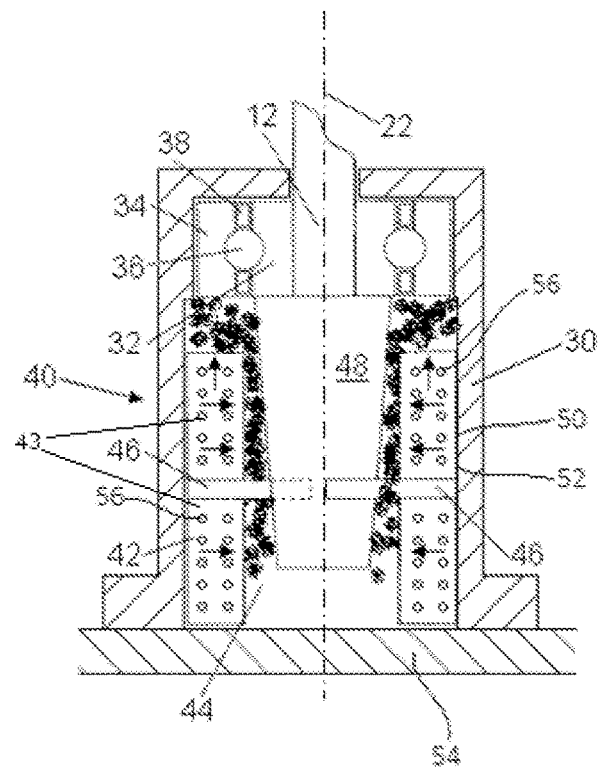
FIG. 4 shows the known lubricant supply system in use.

FIG. 4 is a view similar to FIG. 2 and shows the known lubricant supply system shown in FIG. 3 in use filled with a lubricant. The reservoir matrix 42 is constrained radially in the bore of the reservoir enclosure 30 and also axially by a further housing portion 54 underneath the reservoir in the illustrated orientation of the pump. During pumping, or when there is a differential pressure across the reservoir produced by initial evacuation by a primary pump, outgassing occurs in the reservoir matrix 42 causing trapped gas and microscopic bubbles 56 to "sweep" lubricant both radially inwards through the reservoir material into the bore 44 of the reservoir towards the oil feed nut 48 and axially towards the bearing 26, as shown by the horizontal and vertical arrows, respectively. The lubricant lost from the reservoir generates a lubricant foam 58 which is highly mobile within the pump and can readily be transferred for example into regions where the presence of lubricant is undesirable thereby contaminating the pump or into the bearing causing it to be over-lubricated. The freshly nucleated bubbles increase in size as they travel towards the bore 44 and top of the matrix. An ever increasing volume of foam accumulates in the limited available volume.

Figure 5:
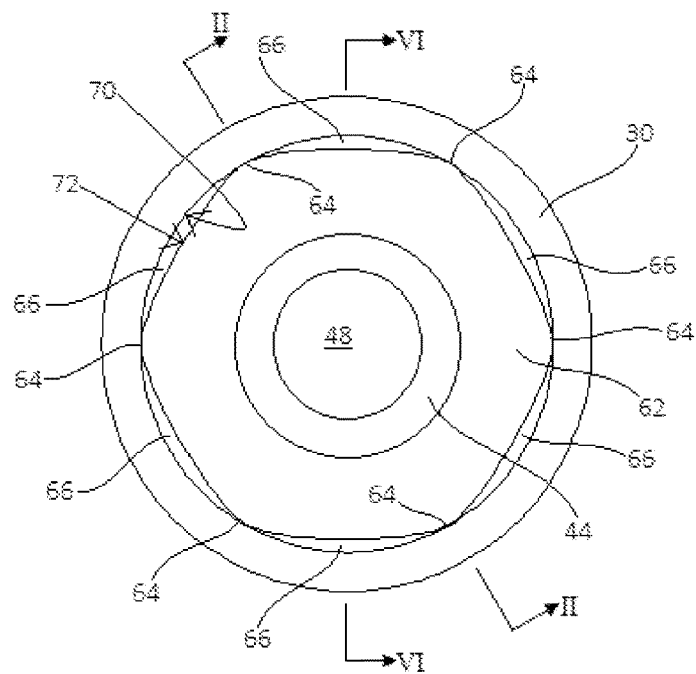
FIG. 5 shows a radial cross-section of an improved lubricant supply system taken along line V-V of FIG. 6.
Figure 6:
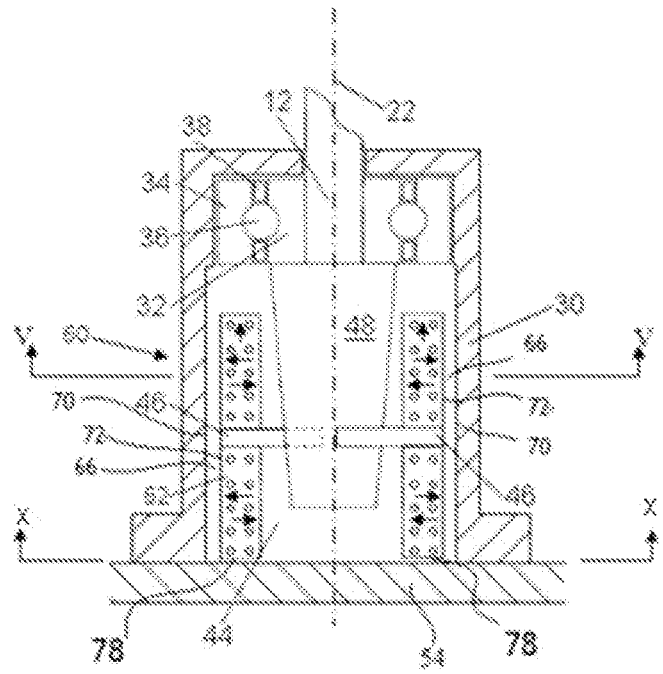
FIG. 6 shows a section of the lubricant supply system taken along line VI-VI of FIG. 5.

FIGS. 5 and 6 show an improved lubricant supply which at least mitigates the problems caused by outgassing and the generation of lubricant foam. FIG. 5 is a view similar to FIG. 3 and shows a cross-section through the lubricant supply system taken along the line V-V in FIG. 6. FIG. 6 is a view similar to FIGS. 2 and 4 taken along line VI-VI in FIG. 5. A view taken along line II-II in FIG. 5 would show an arrangement which is the same as the prior art in FIG. 2 because the section is taken through the contact portions 64, as described in more detail below.

Referring to FIGS. 5 and 6, the lubricant supply system 60 comprises a reservoir matrix 62 for receiving and storing a lubricant, such as oil, for transfer by the lubricant transfer arrangement from the reservoir matrix to the bearing 26. The reservoir matrix is located in position relative to the lubricant transfer arrangement by the housing portion 30 and the axial housing portion 54, which form together a reservoir enclosure.

The reservoir comprises a plurality of contact regions 64 at which the reservoir matrix 62 is in contact with the reservoir enclosure 30 for locating the reservoir matrix in position relative to the oil feed nut 48 and a plurality of spacing regions 66 between respective contact regions at which the reservoir matrix is spaced apart from the reservoir enclosure for receiving a lubricant foam caused by outgassing in the lubricant in the reservoir matrix. In a modified arrangement, the reservoir enclosure may comprise locating means which project radially inward from the enclosure wall to contact and locate the reservoir matrix. In this arrangement, the spacing regions may be substantially continuous around the periphery of the matrix.

The spacing regions 66 provide an escape, or expansion, volume around the outer periphery of the matrix and distal from the matrix bore 44 into which trapped gas can expand or be transferred. Gas trapped in the reservoir matrix when the matrix is initially charging with oil can escape into the peripheral volume and bubbles generated during pumping can expand into the volume which provides a continuous pumping conductance at the periphery of the matrix which mitigates the effects of foaming. Since the reservoir matrix is no longer constrained by the housing portion 30, the forces on the lubricant in the matrix are distributed both radially inwards and outwards, as shown by the horizontal arrows in FIG. 6. Therefore, when gas escapes from the matrix it carries less lubricant with it and as a consequence, lubricant foaming is reduced. In this regard, the mean length of the escape path along which gas in the matrix has to travel in order to escape is reduced and therefore gas travelling along this shorter path accumulates less lubricant. The effect of providing an additional escape path would appear counter-intuitive since it would provide an additional means by which lubricant could be carried out of the matrix. However, to the contrary, the reduction in the mean length of the escape path reduces foaming, as illustrated in FIG. 7 which shows the lubricant supply system 60 in use.

The problems associated with the prior art lubricant supply system become worse as the radius of the reservoir increases together with the length of the escape path, particularly where the aspect ratio of radius to length increases. Therefore, the present invention has particularly utility in these types of reservoirs.

Figure 7:
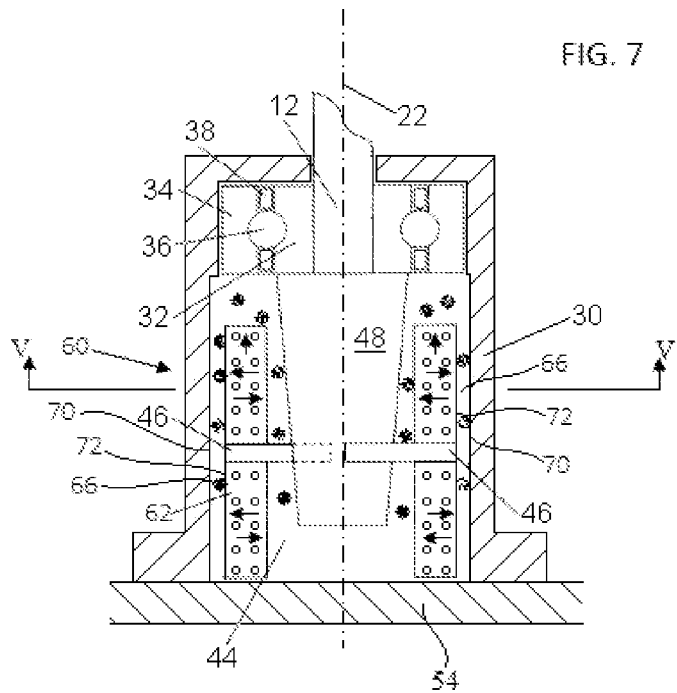
FIG. 7 shows the arrangement of FIG. 6 in use.
Figure 8:
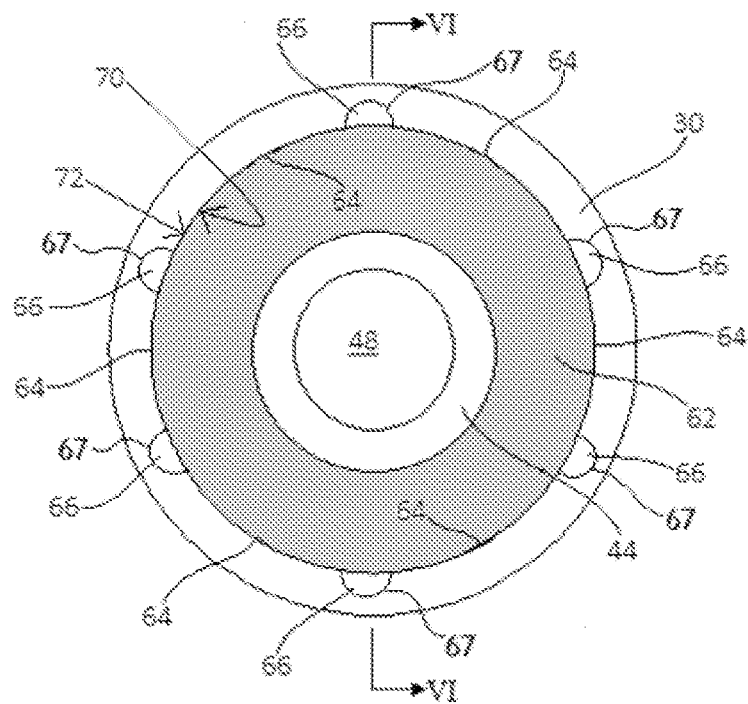
FIG. 8 shows a section of an alternative embodiment of the lubricant supply system taken along line V-V of FIG. 6.
Figure 9:
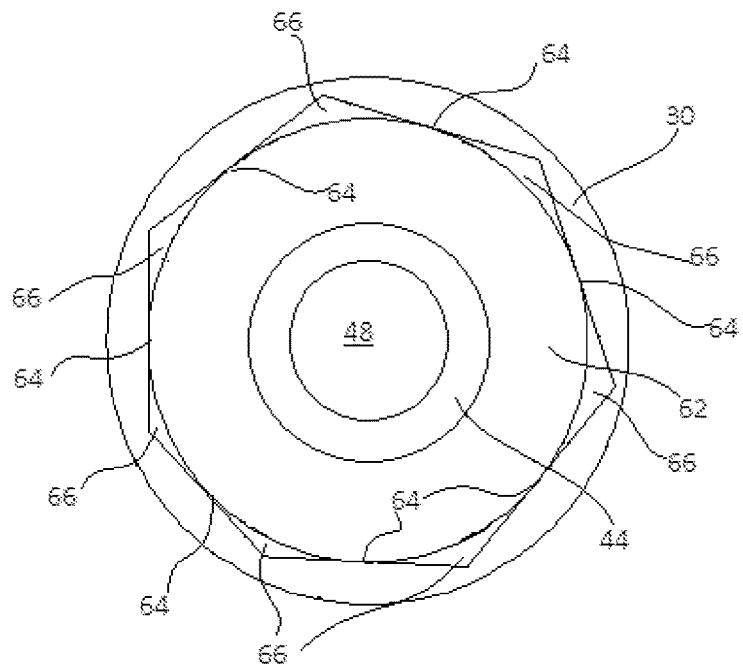
FIG. 9 shows a section of an alternative embodiment of the lubricant supply system taken along line V-V of FIG. 6.
Figure 10:
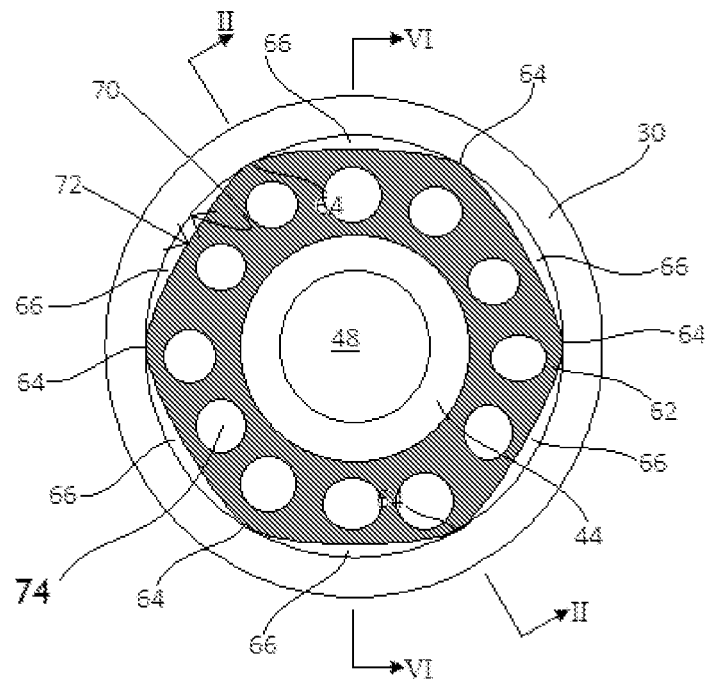
FIG. 10 shows a section of an alternative embodiment of the lubricant supply system taken along line V-V of FIG. 6.
Figure 11:
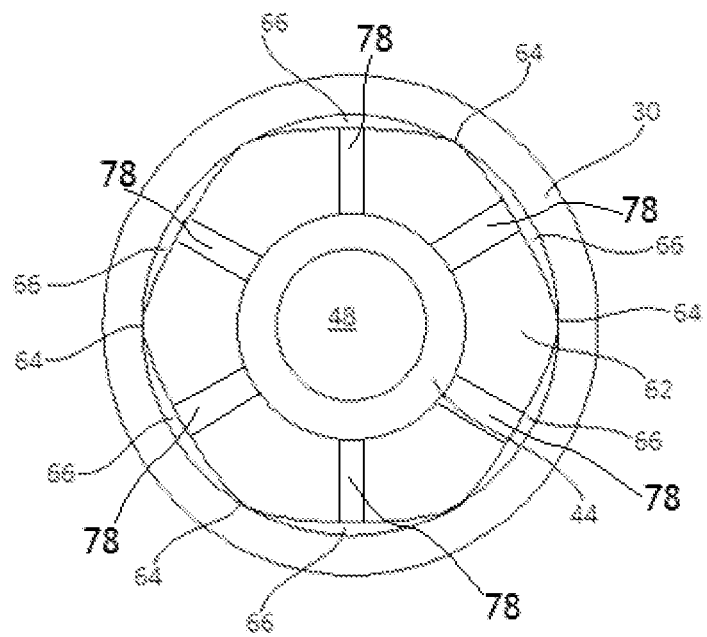
FIG. 11 shows a further additional embodiment of the lubricant supply system taken along line X-X of FIG. 6.
Figure 12A:
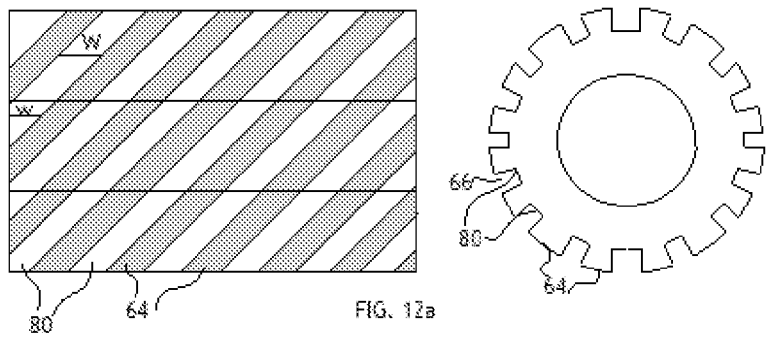
FIGS. 12a and 12b show a side and a plan view, respectively, of further alternative embodiments of the reservoir matrix.
Figure 12B:
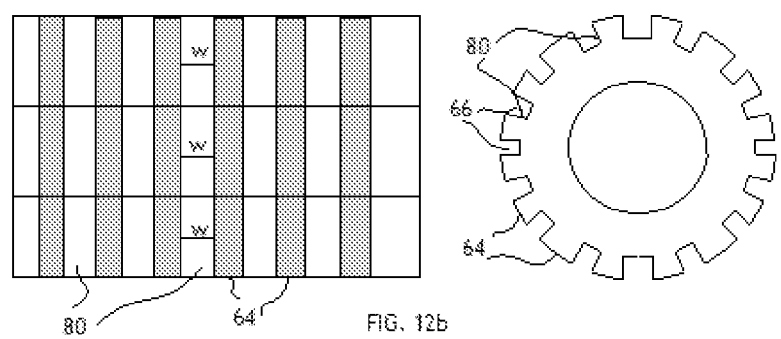

Referring to FIGS. 5 to 7 in more detail, the lubricant transfer arrangement 48, which in this example is an oil feed nut, is located radially inward of the reservoir matrix 62 in bore 44 and has an axis of rotation 22. The reservoir enclosure 30 is located radially outward of the reservoir matrix. The spacing regions 66 are located radially outward of the reservoir matrix around the outer periphery of the matrix. The spacing regions are separated from one another about the circumference by the contact regions 64, which are each located between adjacent spacing regions about the circumference. The spacing regions and contact regions may be uniformly distributed about the circumference or may be irregularly distributed. A uniform spacing is however preferred since it allows gas to escape relatively consistently from all regions of the matrix.

The spacing regions are formed between an internal surface 70 of the reservoir enclosure and an external surface 72 of the reservoir matrix. In the known arrangement shown in FIG. 3, both the internal surface of the reservoir enclosure and the external surface are cylindrical and have a circular cross-section. This arrangement does not provide a volume into which gas can escape from the matrix since the matrix is in intimate contact with the enclosure about its circumference. In the present example shown particularly in FIG. 5, the cross-section of the reservoir enclosure remains the same but the cross-section of the matrix is hexagonal to provide six contact regions and six spacing regions between the contact regions. Whilst a hexagonal cross-section is shown in FIG. 5, other polygonal or irregular cross-sections may be used to provide the required spacing regions for the expansion of gasses. In an alternative arrangement, the internal surface of the reservoir enclosure may have a polygonal or irregular cross-section whilst the external surface of the matrix may have a cylindrical cross-section. In further examples, one of the internal surface of the reservoir enclosure or the external surface of the reservoir matrix may comprise channels for the passage of air or ridges to define spacing regions therebetween.

As shown in FIG. 6, the spacing regions 66 extend axially over the length of the reservoir matrix 62. In this example, the cross-section of the matrix is uniform along the axial extent, although in other examples the cross-section may vary. The spacing regions are open at an axial end the upper of the matrix to allow gasses to be conducted away from the spacing regions. If the spacing regions were not open at at least one axial end they would form pockets which trap gas rather than letting it be conducted away from the matrix. The provision of spacing regions in gas communication with volumes away from the matrix allows gas to be readily conducted and to reduce lubricant foaming.

In use of the vacuum pump 10 and lubricant supply system 60, the reservoir matrix 62 is initially charged with lubricant such as oil. Any gas trapped during filling of the matrix can readily escape into the spacing regions 66, in addition to the bore 44 of the matrix, thereby reducing the propensity for lubricant foaming when the pump is in use. In operation, the motor 24 causes rotation of the turbo molecular pumping mechanism 14 and molecular drag pumping mechanism 16 about the axis of rotation 22. In the example of a vacuum pump having these types of pumping mechanisms, pressures between about 10-3 and 10-7 mbar can be attained, and depending on the tolerances of the pump pressures as low as 10-10 mbar.

Rotation of drive shaft 12 by the motor causes rotation of the lubricant transfer arrangement, or oil feed nut, 48. Lubricant is wicked from the reservoir matrix 62 along the finger projections 46 to the transfer arrangement and transferred to the bearing 26. The generation of vacuum pressures in the pump, principally due to evacuation by a primary pump, generates a pressure differential across the reservoir matrix which induces bubble nucleation and outgassing in the matrix. Bubble nucleation can be accentuated by vibration caused by pump operation. Bubbles of gas are generated, in the matrix around nucleation sites, which increase in size. The spacing regions 66 located at the periphery of the matrix allow the gas bubbles to be dispersed reducing the occurrence of lubricant foaming detrimental to pump and bearing operation.

The invention claimed is:

1. A vacuum pump comprising:
   a bearing; and
   a lubricant supply system for lubricating the bearing, wherein the lubricant supply system comprises:
   a lubricant reservoir comprising a reservoir matrix for receiving a lubricant and a reservoir enclosure; and
   a lubricant transfer arrangement in contact with the reservoir matrix for transferring lubricant from the reservoir matrix to the bearing;
   wherein the lubricant reservoir further comprises a plurality of contact regions at which the reservoir matrix is in contact with the reservoir enclosure to locate the reservoir matrix in position relative to the lubricant transfer arrangement and a plurality of spacing regions located radially outward of the reservoir matrix between respective contact regions at which the reservoir matrix is spaced apart from the reservoir enclosure for receiving gas and lubricant foam caused by outgassing in the lubricant in the reservoir matrix.

2. The vacuum pump as claimed in claim 1, wherein the vacuum pump has an axis of rotation, and wherein the lubricant transfer arrangement is located radially inward of the reservoir matrix, and the reservoir enclosure is located radially outward of the reservoir matrix.

3. The vacuum pump as claimed in claim 2, wherein the spacing regions are formed between an internal surface of the reservoir enclosure and an external surface of the reservoir matrix.

4. The vacuum pump as claimed in claim 3, wherein one of the internal surface of the reservoir enclosure or the external surface of the reservoir matrix has a polygonal cross-section.

5. The vacuum pump as claimed in claim 4, wherein the other of the external surface or the internal surface has a circular cross-section.

6. The vacuum pump as claimed in claim 2, wherein the spacing regions are located about the circumference of the reservoir matrix and adjacent spacing regions are separated by respective contact regions.

7. The vacuum pump as claimed in claim 6, wherein one of the internal surface of the reservoir enclosure or the external surface of the reservoir matrix has a polygonal cross-section.

8. The vacuum pump as claimed in claim 7, wherein the other of the external surface or the internal surface has a circular cross-section.

9. The vacuum pump as claimed in claim 2, wherein the spacing regions extend axially over an axial length of the reservoir matrix.

10. The vacuum pump as claimed in claim 9, wherein one of the internal surface of the reservoir enclosure or the external surface of the reservoir matrix has a polygonal cross-section.

11. A lubricant supply system for a vacuum pump, the lubricant supply system comprising:
 a lubricant reservoir comprising a reservoir matrix for receiving a lubricant and a reservoir enclosure; and
 a lubricant transfer arrangement in contact with the reservoir matrix for transferring lubricant from the reservoir matrix to a bearing;
 wherein the lubricant reservoir further comprises a plurality of contact regions at which the reservoir matrix is in contact with the reservoir enclosure to locate the reservoir matrix in position relative to the lubricant transfer arrangement and a plurality of spacing regions located radially outward from the reservoir matrix between respective contact regions at which the reservoir matrix is spaced apart from the reservoir enclosure for receiving gas and lubricant foam caused by outgassing in the lubricant in the reservoir matrix.

12. The lubricant supply system as claimed in claim 11, wherein the spacing regions are formed between an internal surface of the reservoir enclosure and an external surface of the reservoir matrix.

13. The lubricant supply system as claimed in claim 12, wherein the spacing regions are located about the circumference of the reservoir matrix and adjacent spacing regions are separated by respective contact regions.

14. The lubricant supply system as claimed in claim 13, wherein one of the internal surface of the reservoir enclosure or the external surface of the reservoir matrix has a polygonal cross-section.

15. The lubricant supply system as claimed in claim 14, wherein the other of the external surface or the internal surface has a circular cross-section.

16. The lubricant supply system as claimed in 10, wherein one of the internal surface of the reservoir enclosure or the external surface of the reservoir matrix has a polygonal cross-section.

17. The lubricant supply system as claimed in claim 16, wherein the other of the external surface or the internal surface has a circular cross-section.

18. The lubricant supply system as claimed in claim 11, wherein the spacing regions extend over a length of the reservoir matrix.

19. The lubricant supply system as claimed in claim 18, wherein one of the internal surface of the reservoir enclosure or the external surface of the reservoir matrix has a polygonal cross-section.

* * * * *